United States Patent
Hatsutori et al.

(10) Patent No.: US 10,331,415 B2
(45) Date of Patent: Jun. 25, 2019

(54) FORMAL SPECIFICATION GENERATION USING EXAMPLES

(71) Applicant: INTERNATIONAL BUSINESS MACHINES CORPORATION, Armonk, NY (US)

(72) Inventors: Yoichi Hatsutori, Tokyo (JP); Futoshi Iwama, Tokyo (JP); Shin Saito, Tokyo (JP); Takaaki Tateishi, Tokyo (JP); Hideo Watanabe, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 196 days.

(21) Appl. No.: 15/346,634

(22) Filed: Nov. 8, 2016

(65) Prior Publication Data
US 2018/0129478 A1    May 10, 2018

(51) Int. Cl.
| | |
|---|---|
| *G06F 8/20* | (2018.01) |
| *G06F 8/30* | (2018.01) |
| *G06F 8/10* | (2018.01) |
| *G06F 8/73* | (2018.01) |
| *G06F 11/36* | (2006.01) |
| *G06F 17/27* | (2006.01) |
| *G06F 17/28* | (2006.01) |

(52) U.S. Cl.
CPC ............... *G06F 8/10* (2013.01); *G06F 8/20* (2013.01); *G06F 8/30* (2013.01); *G06F 11/36* (2013.01); *G06F 11/3608* (2013.01); *G06F 17/277* (2013.01); *G06F 17/2872* (2013.01); *G06F 8/73* (2013.01)

(58) Field of Classification Search
CPC .................................... G06F 8/20; G06F 8/30
USPC .................................................. 717/100–113
See application file for complete search history.

(56) References Cited

U.S. PATENT DOCUMENTS

| | | |
|---|---|---|
| 7,844,951 B2 | 11/2010 | Chen et al. |
| 7,941,438 B2 | 5/2011 | Moilina-Moreno et al. |
| 8,943,465 B2 | 1/2015 | Broadfoot et al. |

(Continued)

OTHER PUBLICATIONS

Ishihara et al., "A Translation Method from Natural Language Specifications into Formal Specifications Using Contextual Dependencies" (Year: 1992).*

(Continued)

*Primary Examiner* — Phillip H Nguyen
(74) *Attorney, Agent, or Firm* — Tutunjian & Bitetto, P.C.; Vazken Alexanian (57) ABSTRACT

A computer-implemented method and computing device are provided for generating a formal specification of a function. The method includes extracting a set of words from requirements of the function. The method further includes translating the set of words to a set of specification fragments. The method also includes converting the set of the specification fragments to a set of production rules. The method additionally includes constructing multiple prospective specifications from the set of production rules taking into account a syntax of the formal specification. The method further includes validating each of the multiple prospective specifications using input-output examples. The method also includes generating the formal specification of the function from validated ones of the multiple prospective specifications.

20 Claims, 10 Drawing Sheets

(56) References Cited

U.S. PATENT DOCUMENTS

| | | | |
|---|---|---|---|
| 9,152,385 B2 | 10/2015 | Chakrapani Rao et al. | |
| 2002/0062475 A1* | 5/2002 | Iborra | G06F 8/30 717/108 |
| 2003/0046061 A1* | 3/2003 | Preston | G06F 8/30 704/9 |
| 2007/0074180 A1* | 3/2007 | Hinchey | G06F 8/10 717/136 |
| 2010/0146491 A1* | 6/2010 | Hirano | G06F 9/454 717/137 |
| 2012/0191833 A1* | 7/2012 | Liu | H04L 45/7457 709/223 |
| 2017/0031896 A1* | 2/2017 | Dymetman | G06F 17/2715 |
| 2017/0293276 A1* | 10/2017 | Hubauer | G05B 19/042 |

OTHER PUBLICATIONS

Konrad et al., "Facilitating the Construction of Specification Pattern-based Properties" (Year: 2005).*

Mirovia et al., "Finite-State-Transducers for Natural Language Processing" (Year: 2012).*

Lamsweerde, "Formal Specification: a Roadmap" (Year: 2000).*

Cabral, et al., "Formal Specification Generation from Requirement Documents", Electronic Notes in Theoretical Computer Science 195 (2008), Jan. 2008, pp. 171-188.

Fatwanto, et al., "Natural Language Requirements Specification Analysis Using Part-of-Speech Tagging", IEEE, Nov. 2013, pp. 98-102.

Ilieva, et al., "Automatic Transition of Natural Language Software Requirements Specification into Formal Presentation", Springer-Verlag Berlin Heidelberg, Jun. 2005, pp. 392-397.

Minamide, Yasuhiko, "Static Approximation of Dynamically Generated Web Pages", WWW 2005, May 2015, pp. 432-441.

Mohri, et al., "Regular Approximation of Context-Free Grammars Through Transformation", Robustness in Language and Speech Technology, Chapter 9, 2000, pp. 251-261.

Dr. Graband, et al., "ETCS Requirements Specification and Validation: The Methodology", RINA, Jun. 2007, pp. 1-48.

\* cited by examiner

Display the result of increasing X and Y by 1 and multiply them.

W1 = ["display":verb,
       "the result of":na]
W2 = ["increase":verb, "by 1":na]
W3 = ["X":np]
W4 = ["Y":np]
W5 = ["multiply":verb]

M1 = {"output = $A:expr":any}
M2 = {"$A:expr + 1":expr}
M3 = {"X:var":var}
M4 = {"Y:var":var}
M5 = {"$A:expr * $A:expr"}

FORMAL SPECIFICATION GENERATION USING EXAMPLES

BACKGROUND

Technical Field

The present invention relates generally to information processing and, in particular, to formal specification generation using examples.

Description of the Related Art

It is desirable to obtain a formal specification from requirements written in natural language using input-output examples. As an example, a person can intend to obtain a formal specification from the problem descriptions in a programming contest. It is presumed that the input-output examples are given and that we can check if the examples satisfy the specifications.

However, syntax-based translation to obtain an accurate formal specification is applicable only to very limited standardized documents. For example, the structure of natural language sentences is different from that of mathematical expressions. In general, simple relationships cannot be found between vocabularies in the documents and mathematical expressions.

Thus, there is a need for improved formal specification generation using examples.

SUMMARY

According to an aspect of the present invention, a computer-implemented method is provided for generating a formal specification of a function. The method includes extracting a set of words from requirements of the function. The method further includes translating the set of words to a set of specification fragments. The method also includes converting the set of the specification fragments to a set of production rules. The method additionally includes constructing multiple prospective specifications from the set of production rules taking into account a syntax of the formal specification. The method further includes validating each of the multiple prospective specifications using input-output examples. The method also includes generating the formal specification of the function from validated ones of the multiple prospective specifications.

According to another aspect of the present invention, a computer program product is provided for generating a formal specification of a function. The computer program product includes a non-transitory computer readable storage medium having program instructions embodied therewith. The program instructions are executable by a computer to cause the computer to perform a method. The method includes extracting a set of words from requirements of the function. The method further includes translating the set of words to a set of specification fragments. The method also includes converting the set of the specification fragments to a set of production rules. The method additionally includes constructing multiple prospective specifications from the set of production rules taking into account a syntax of the formal specification. The method further includes validating each of the multiple prospective specifications using input-output examples. The method also includes generating the formal specification of the function from validated ones of the multiple prospective specifications.

According to yet another aspect of the present invention, a computing device is provided for generating a formal specification of a function. The computing device includes a processor and a memory operably coupled to the processor. The processor and the memory are configured to extract a set of words from requirements of the function. The processor and the memory are further configured to translate the set of words to a set of specification fragments. The processor and the memory are also configured to convert the set of the specification fragments to a set of production rules. The processor and the memory are additionally configured to construct multiple prospective specifications from the set of production rules taking into account a syntax of the formal specification. The processor and the memory are further configured to validate each of the multiple prospective specifications using input-output examples. The processor and the memory are also configured to generate the formal specification of the function from validated ones of the multiple prospective specifications.

These and other features and advantages will become apparent from the following detailed description of illustrative embodiments thereof, which is to be read in connection with the accompanying drawings.

BRIEF DESCRIPTION OF DRAWINGS

The following description will provide details of preferred embodiments with reference to the following figures wherein.

DETAILED DESCRIPTION

The present invention is directed to formal specification generation using examples.

In an embodiment, the present invention uses only local context to extract potential fragments of the formal specification. Without relying on the syntax and semantics of natural language, the present invention can extract key information from a natural language description of a mathematical function, based on only word and idiomatic patterns associated with mathematical components.

In an embodiment, the present invention creates all possible combinations of the extracted specification fragments taking account of constraints on the combinations derived from the syntax of the specification language. For example, a correct specification can be chosen by validating the extracted specification fragments using input-output examples. As used herein, the term "input/output examples" refers to examples of inputs and corresponding outputs of a mathematical function for which a formal specification is generated.

Figure 1:
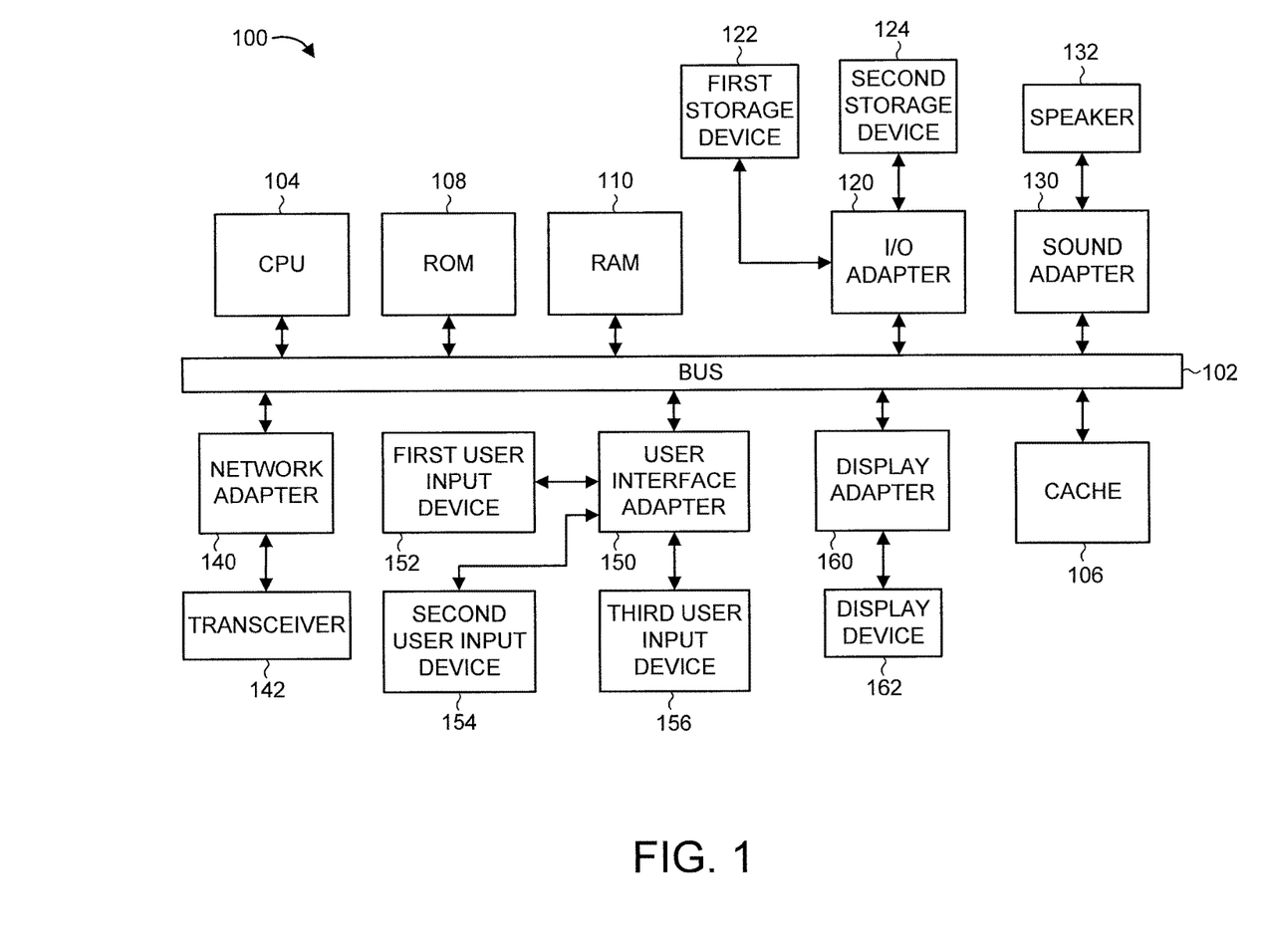
FIG. 1 shows an exemplary processing system to which the present invention may be applied, in accordance with an embodiment of the present invention.

FIG. 1 shows an exemplary processing system 100 to which the present invention may be applied, in accordance with an embodiment of the present invention. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Figure 2:
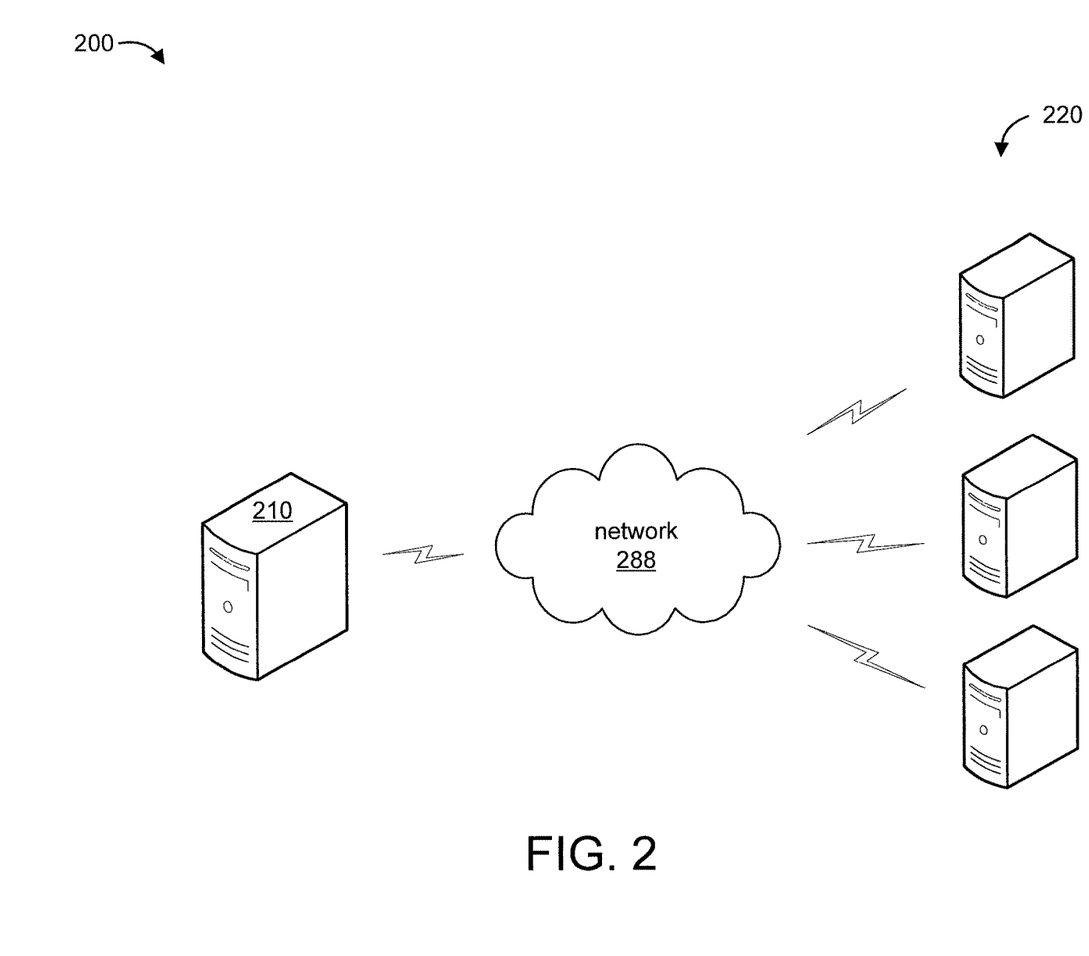
FIG. 2 shows an exemplary environment to which the present invention can be applied, in accordance with an embodiment of the present invention.

Moreover, it is to be appreciated that environment 200 described below with respect to FIG. 2 is an environment for implementing respective embodiments of the present invention. Part or all of processing system 100 may be implemented in one or more of the elements of environment 200.

Figure 3:
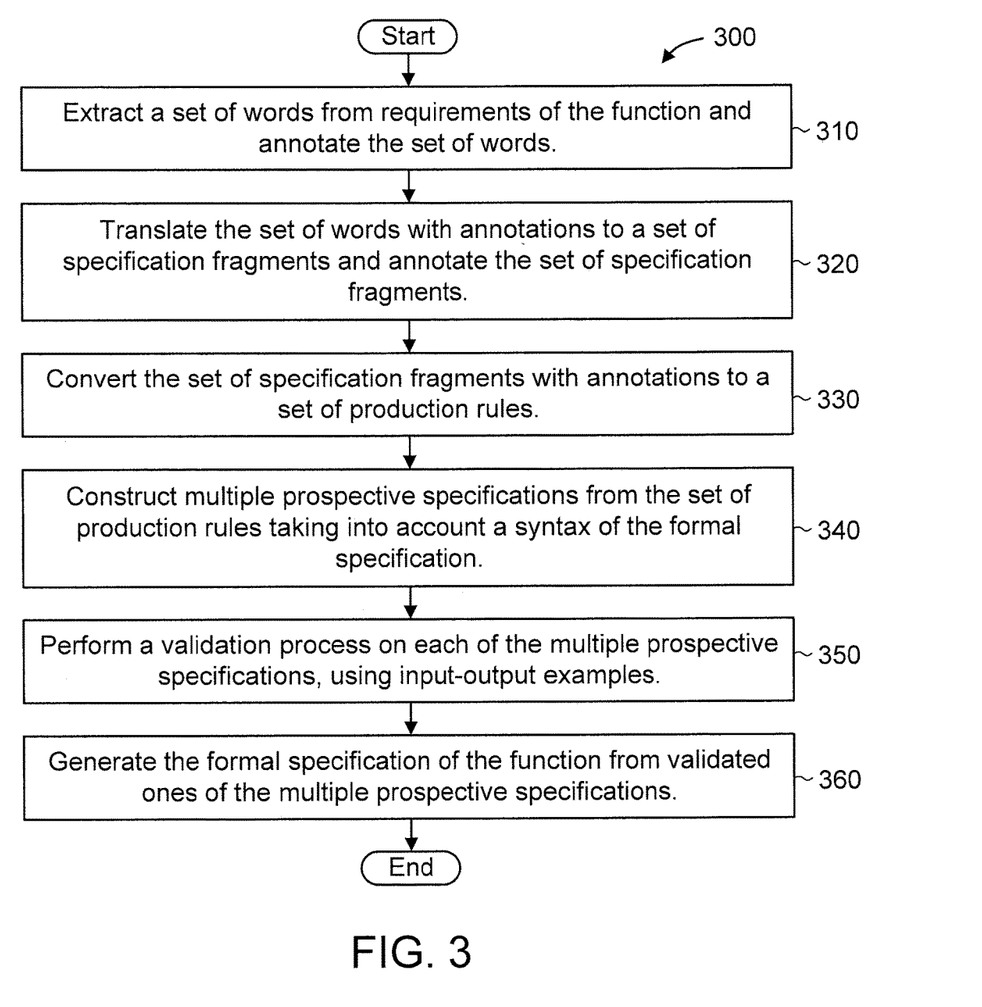
FIG. 3 shows an exemplary method for formal specification generation using examples, in accordance with an embodiment of the present invention.
Figure 11:
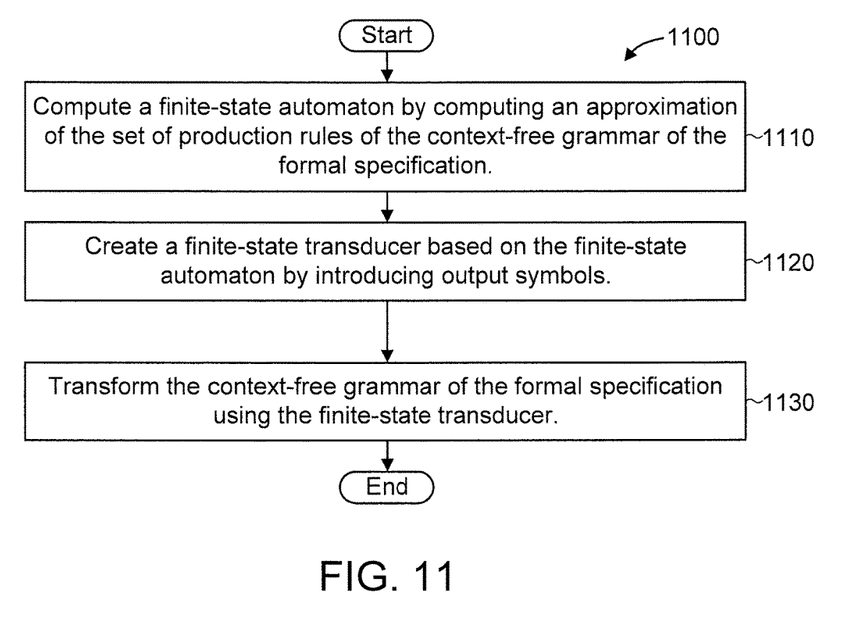
FIG. 11 shows an exemplary method for production rule composition, in accordance with an embodiment of the present invention.
Figure 12:
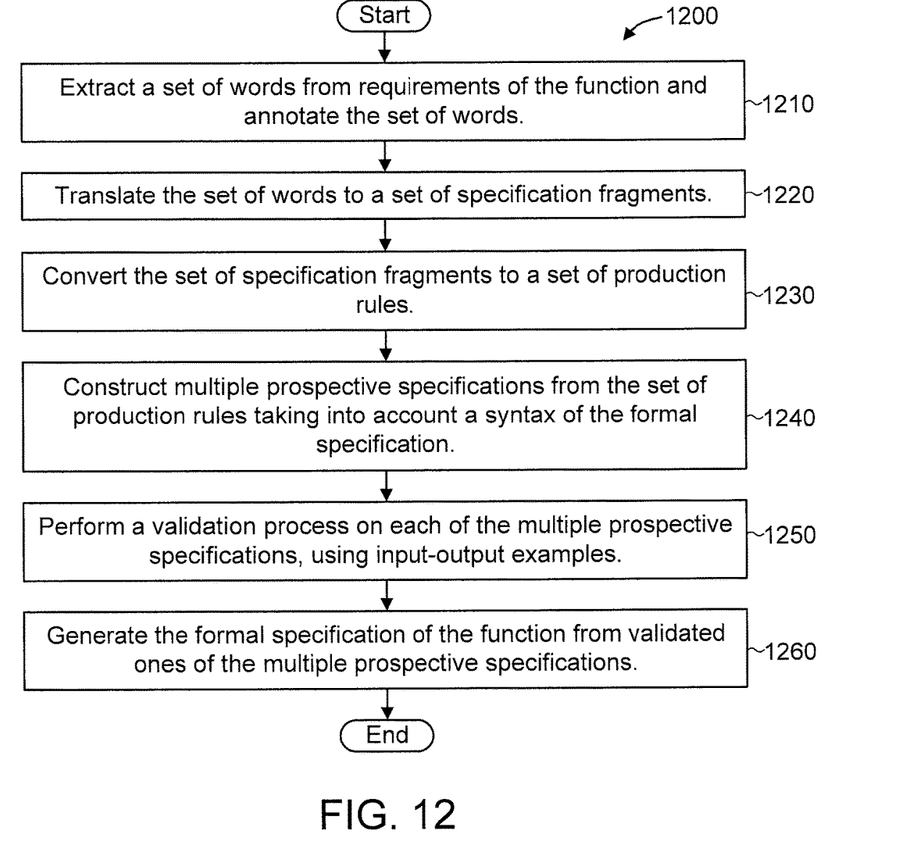
FIG. 12 shows another exemplary method for formal specification generation using examples, in accordance with an embodiment of the present invention.

Further, it is to be appreciated that processing system 100 may perform at least part of the method described herein including, for example, at least part of method 300 of FIG. 3 and/or at least part of method 1100 of FIG. 11 and/or at least part of method 1200 of FIG. 12. Similarly, part or all of environment 200 may be used to perform at least part of method 300 of FIG. 3 and/or at least part of method 1100 of FIG. 11 and/or at least part of method 1200 of FIG. 12.

FIG. 2 shows an exemplary environment 200 to which the present invention can be applied, in accordance with an embodiment of the present invention.

The environment 200 includes a computing device 210. The environment 200 further includes a set of computing devices collectively and individually denoted by the figure reference numeral 220.

In the embodiment of FIG. 2, computing device 210 is configured to implement the teachings of the present invention. For example, computing device 210 is configured to generate a formal specification of a function such as, but not limited to, a mathematical function. Generation of the formal specification of the function is performed using input/output examples.

The generation of the formal specification of the function can be based on a request for the same from any of the computing devices 220. The input/output examples can be provided from one or more of the computing devices 220. In an embodiment, one of the computing devices 220 can issue a request for generation of a formal specification of a function to computing device 210 and a different one or more of the computing devices 220 can provide the input/output examples to computing device 210 in support of the request. In another embodiment, computing device 210 implements the present invention without using any of computing devices 220 in any manner. These and other possible scenarios in environment 200 to which the present invention can be applied are readily determined by one of ordinary skill in the art, given the teachings of the present invention provided herein.

It is to be appreciated that the computing device 210 and the computing devices in the set 220 can be any type of computing device. For the sake of illustration, computing device 210 is implemented herein by a server, as well as each of computing devices 220, with each of the devices 210 and 220 interchangeably referred to herein as such (server).

Communications between the computing device 210 and the computing devices 220 can occur over one or more wired communications networks/arrangements and/or one or more wireless networks. For the sake of illustration, in the embodiment of FIG. 2, one or more wireless networks 288 are used to connect the computing device 210 to the computing devices 220. The one or more wireless networks 288 can involve any type of wireless communication technology.

While certain types of communication technologies are described between the elements of FIG. 2 for the sake of illustration, it is to be appreciated that any type of communication technology can be used including combinations of more than one, while maintaining the spirit of the present invention. For example, any type of network such as, for example, but not limited to, cellular networks, local area networks, wide area networks, personal area networks, wireless networks, wired networks, any combination of the preceding, and so forth can be used. These and other variations of the elements of FIG. 2 are readily contemplated by one of ordinary skill in the art, while maintaining the spirit of the present invention.

In the embodiment shown in FIG. 2, the elements thereof are interconnected by a network(s) 288. However, in other embodiments, other types of connections can also be used. Additionally, one or more elements in FIG. 2 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the elements of environment 200 are readily determined by one of ordinary skill in the art, given the teachings of the present invention provided herein, while maintaining the spirit of the present invention.

A description will now be given of variables relating to a method in accordance with an embodiment of the present invention described with respect to FIG. 3. FIGS. 4-9 correspond to various steps of the method of FIG. 3.

Specification Generation System=(G, X, W, Cw, M, Cm, R, D, F, Ex), where the following definitions apply:
G: Grammar representing syntax of specification (e.g.: context-free grammar);
X: set of placeholders (or variables);
W: set of word sequences;
R: a set of production rules;
M: a set of sequences, each including terminal symbols of G and element of X*Cm;
D: Pow(W*Cw)→Pow(M*Cm) (semantic mapping);
F: Pow(M*Cm)→Pow(R) (production rule generator);
Ex: a set of examples (=assignments);
Cw: a set of annotations for W; and
Cm: a set of annotations for M and X.

Examples of notations, using some of the preceding variables:
Given W={"word"} and Cw={"np"}, W*Cw={"word":np}; and
Given M={"$A:expr", "X"} and Cm={expr}, M*Cm={"$A:expr":expr, "X":expr}

FIG. 3 shows an exemplary method 300 for formal specification generation using examples, in accordance with an embodiment of the present invention. The formal specification is for a function (e.g., a mathematical function).

Figure 4:
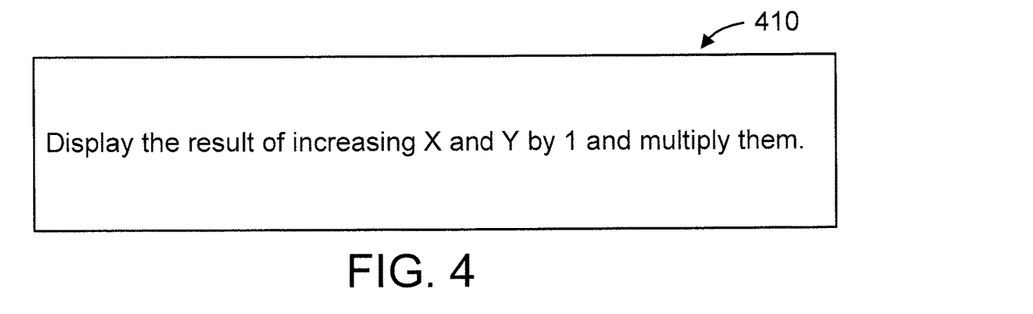
FIG. 4 shows an exemplary natural language description of a function, to which step 310 of the method of FIG. 3 can be applied, in accordance with an embodiment of the present invention.
Figure 5:
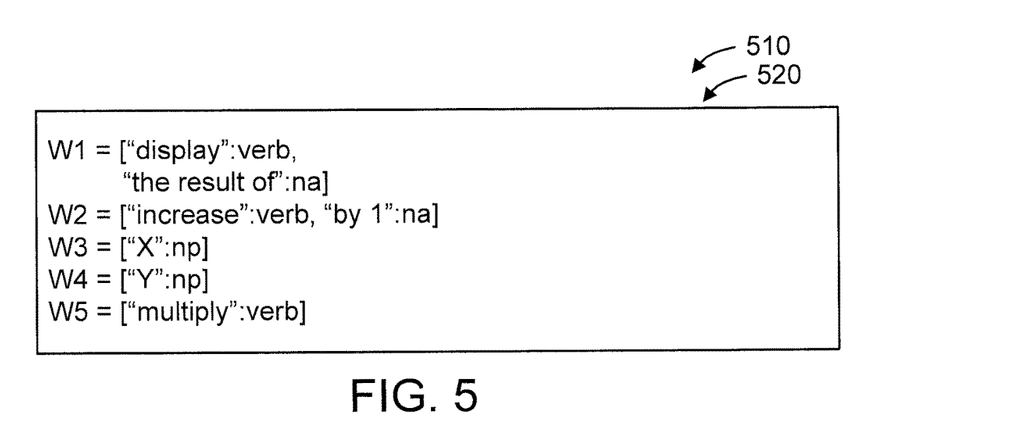
FIG. 5 shows an exemplary set of words 510 extracted from the natural language description 410 of FIG. 4 with annotations 520, in accordance with an embodiment of the present invention.

At step 310, extract a set of words from requirements of the function and annotate the set of words. In an embodiment, the requirements of the function are written in natural language. FIG. 4 shows an exemplary natural language description 410 of a function, to which step 310 of method 300 of FIG. 3 can be applied, in accordance with an embodiment of the present invention. FIG. 5 shows an exemplary set of words 510 extracted from the natural language description 410 of FIG. 4 with annotations 520, in accordance with an embodiment of the present invention.

Figure 6:
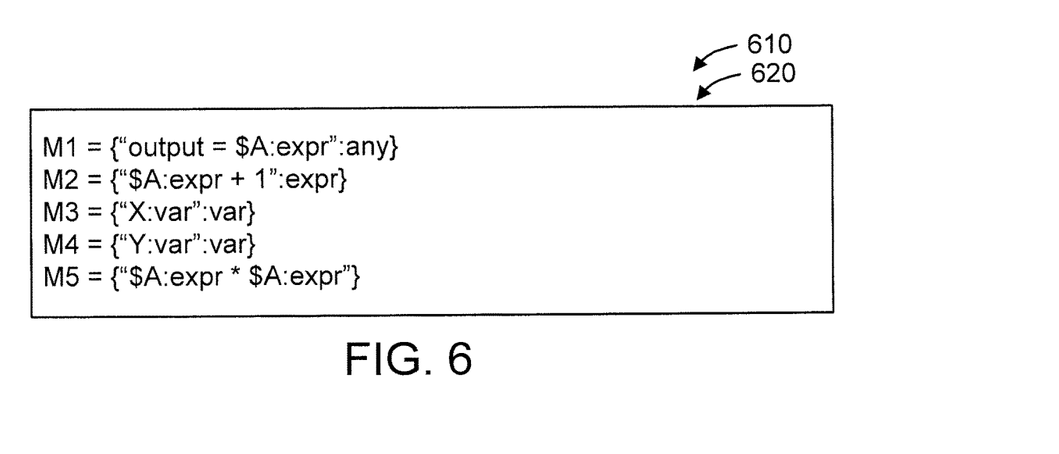
FIG. 6 shows exemplary potential specification fragments 610 with annotations 620, translated from the set of words 510 with annotations 520 of FIG. 5, in accordance with an embodiment of the present invention.
Figure 7:
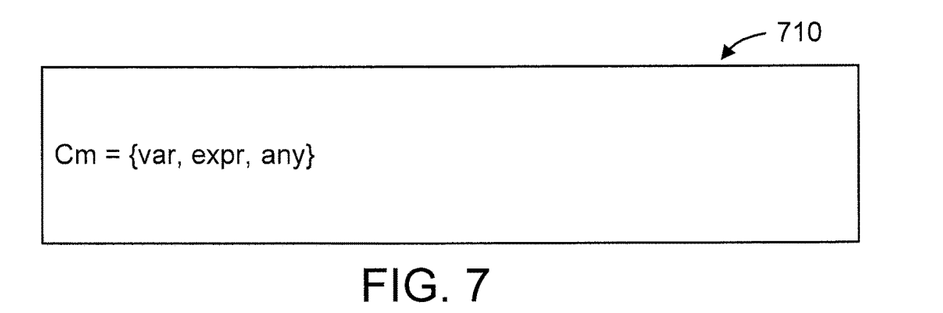
FIG. 7 shows a structure of annotations for the potential specification fragments 610 of FIG. 6, in accordance with an embodiment of the present invention.

Referring again to FIG. 3, at step 320, translate the set of words with annotations to a set of specification fragments and annotate the set of specification fragments. In an embodiment, the set of words is translated into the set of specification fragments using only a local context of the words without consideration of syntax and semantics of the natural language. In an embodiment, the set of words is translated into the set of specification fragments based on only word and idiomatic patterns associated with one or more mathematical concepts. In an embodiment, the set of words is translated into the set of specification fragments using semantic mapping. In an embodiment, step 320 involves creating possible combinations of specification fragments taking into account constraints on the possible combinations, where the constraints are derived from a syntax of a language of a formal specification. FIG. 6 shows exemplary potential specification fragments 610 with annotations 620, translated from the set of words 510 with annotations 520 of FIG. 5, in accordance with an embodiment of the present invention. FIG. 7 shows a structure 710 of annotations for the potential specification fragments 610 of FIG. 6, in accordance with an embodiment of the present invention.

Figure 8:
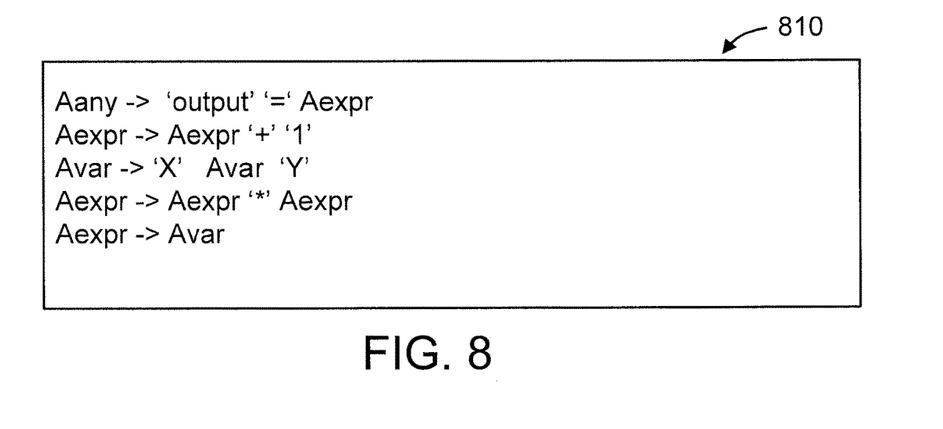
FIG. 8 shows exemplary production rules 810 converted from the potential specification fragments 610 with annotations 620 of FIG. 6, in accordance with an embodiment of the present invention.

Referring again to FIG. 3, at step 330, convert the set of specification fragments with annotations to a set of production rules. In an embodiment, step 330 takes (i) a context-free grammar of the formal specification and (ii) a set of production rules of the context-free grammar of the formal specification as inputs, and outputs a subset of the context-free grammar of the formal specification. FIG. 8 shows exemplary production rules 810 converted from the potential specification fragments 610 with annotations 620 of FIG. 6, in accordance with an embodiment of the present invention.

Figure 9:
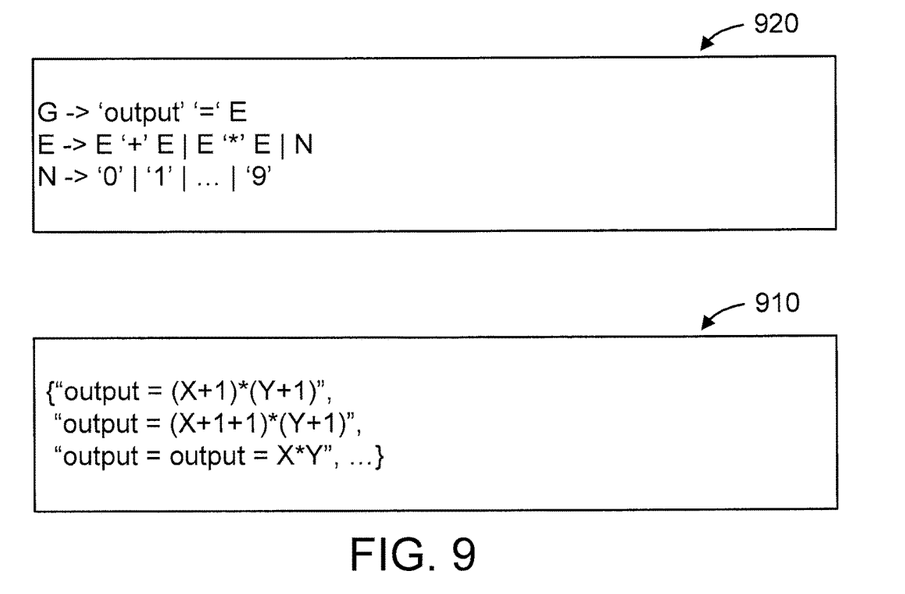
FIG. 9 shows exemplary prospective specifications constructed from the production rules of FIG. 8 and a syntax G of a formal specification, in accordance with an embodiment of the present invention.

Referring again to FIG. 3, at step 340, construct multiple prospective specifications from the set of production rules taking into account a syntax of the formal specification. FIG. 9 shows exemplary prospective specifications 910 constructed from the production rules 810 of FIG. 8 and a syntax G 920 of the formal specification, in accordance with an embodiment of the present invention.

At step 350, perform a validation process on each of the multiple prospective specifications, using input-output examples. The validation process determines whether or not each of the multiple prospective specifications satisfy the formal specification, using input-output examples. The prospective specifications that satisfy the formal specification are considered validated.

Figure 10:
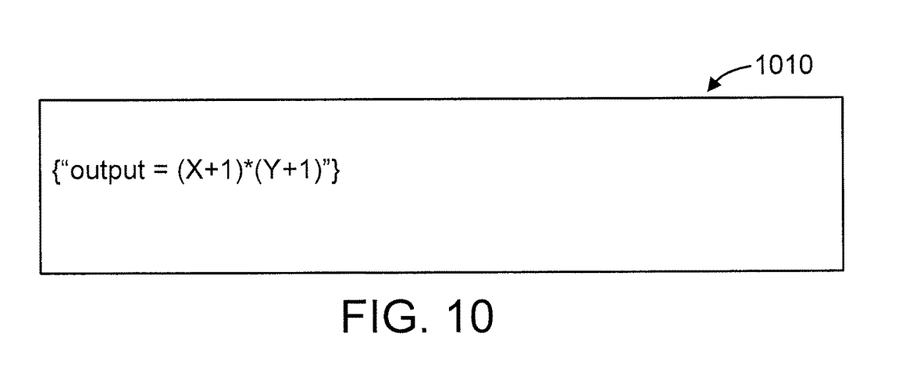
FIG. 10 shows an exemplary formal specification generated from validated ones of the multiple prospective specifications of FIG. 9, in accordance with an embodiment of the present invention.

At step 360, generate the formal specification of the function from validated ones of the multiple prospective specifications. FIG. 10 shows an exemplary formal specification 1010 generated from validated ones of the multiple prospective specifications 910 of FIG. 9, in accordance with an embodiment of the present invention.

FIG. 11 shows an exemplary method 1100 for production rule composition, in accordance with an embodiment of the present invention.

In an embodiment, the inputs to method 1100 include: G, namely, a context-free grammar of specification; and R, namely, a set of production rules of a context-free grammar. In an embodiment, the output from method 1100 includes H, namely, a subset of G.

At step 1110, compute a finite-state automaton by computing an approximation of the set of production rules of the context-free grammar of the formal specification. For example, step 1110 can involve performing the approximation by creating a pushdown automaton from R, and ignoring the stack. Of course, other techniques can be used to perform the approximation, while maintaining the spirit of the present invention.

At step 1120, create a finite-state transducer based on the finite-state automaton by introducing output symbols. In an embodiment, for example, step 1120 involves a process of adding an output symbol to every transition rule of the finite-state automaton where the name of the output symbol is the same as the name of the input symbol of the transition rule of the finite-state automaton.

At step 1130, transform the context-free grammar of the formal specification using the finite-state transducer. In an embodiment, for example, step 1130 involves the process of applying the finite-state transducer to the context-free grammar since the finite-state transducer is a function that maps a context-free grammar to another context-free grammar.

It is to be appreciated that the purpose of steps 1120 and 1130 is to compute the intersection of a finite-state automaton and a context-free grammar.

A description will now be given of variables relating to another method in accordance with an embodiment of the present invention described with respect to FIG. 12. The method described in FIG. 12 is a simplified form of method 300 of FIG. 3. FIGS. 13-16 correspond to various steps of the method of FIG. 12.

Specification Generation System SG=(G, X, W, M, R, D, F, Ex)
G: Grammar representing syntax of spec. (e.g.: context-free grammar)
X: set of placeholders (or variables)
W: set of word sequences
R: a set of production rules
M: a set of sequences each of which consists of terminal symbols of G and placeholders in X
D: Pow(W)→Pow(M) (semantic mapping)
F: Pow(M)→Pow(R) (production rule generator)
Ex: a set of examples (=assignments)

FIG. 12 shows another exemplary method 1200 for formal specification generation using examples, in accordance with an embodiment of the present invention. The formal specification is for a function (e.g., a mathematical function).

Figure 13:
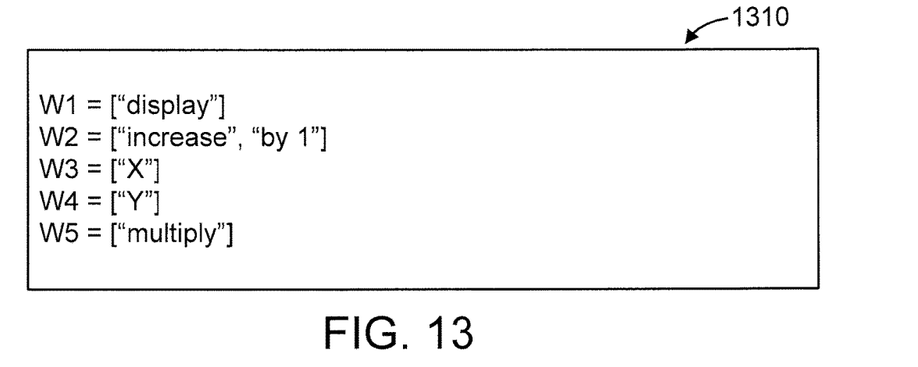
FIG. 13 shows an exemplary set of words extracted from the natural language description of FIG. 12, in accordance with an embodiment of the present invention.

At step 1210, extract a set of words from requirements of the function. In an embodiment, the requirements of the function are written in natural language. For example, step 1210 can be applied so as to extract the set of words from the natural language description 410 shown in FIG. 4 regarding method 300. Thus, method 300 and method 1200 can use the same natural language description shown in FIG. 4. FIG. 13 shows an exemplary set of words 1310 extracted from the natural language description 410 of FIG. 4, in accordance with an embodiment of the present invention.

Figure 14:
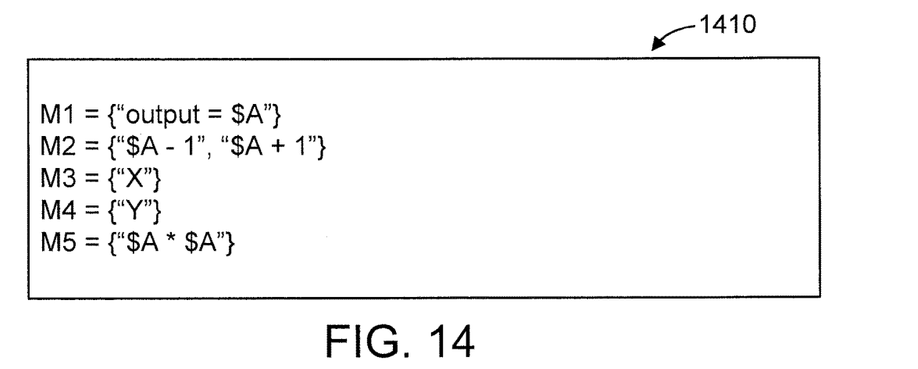
FIG. 14 shows exemplary potential specification fragments translated from the set of words of FIG. 13, in accordance with an embodiment of the present invention.

Referring again to FIG. 12, at step 1220, translate the set of words to a set of specification fragments. In an embodiment, the set of words is translated into the set of specification fragments using only a local context of the words without consideration of syntax and semantics of the natural language. In an embodiment, the set of words is translated into the set of specification fragments based on only word and idiomatic patterns associated with one or more mathematical concepts. In an embodiment, the set of words is translated into the set of specification fragments using semantic mapping. In an embodiment, step 1220 involves creating possible combinations of specification fragments taking into account constraints on the possible combinations, where the constraints are derived from a syntax of a language of a formal specification. FIG. 14 shows exemplary potential specification fragments 1410 translated from the set of words 1310 of FIG. 13, in accordance with an embodiment of the present invention.

Figure 15:
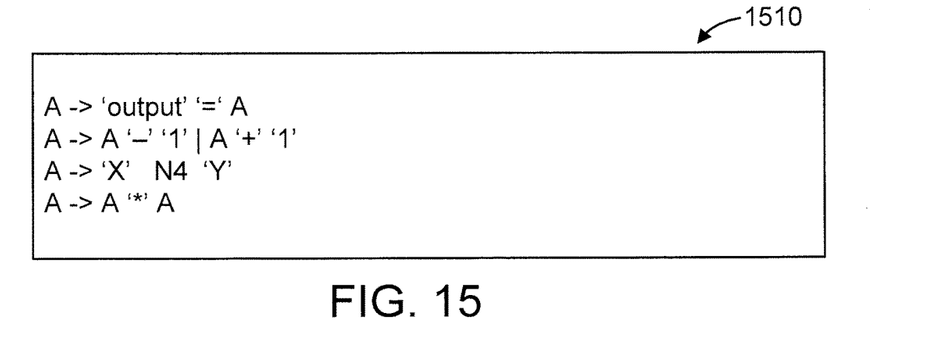
FIG. 15 shows exemplary production rules converted from the potential specification fragments of FIG. 14, in accordance with an embodiment of the present invention.

Referring again to FIG. 12, at step 1230, convert the set of specification fragments to a set of production rules. In an embodiment, step 1230 takes (i) a context-free grammar of the formal specification and (ii) a set of production rules of the context-free grammar of the formal specification as inputs, and outputs a subset of the context-free grammar of the formal specification. FIG. 15 shows exemplary production rules 1510 converted from the potential specification fragments 1410 of FIG. 14, in accordance with an embodiment of the present invention.

Figure 16:
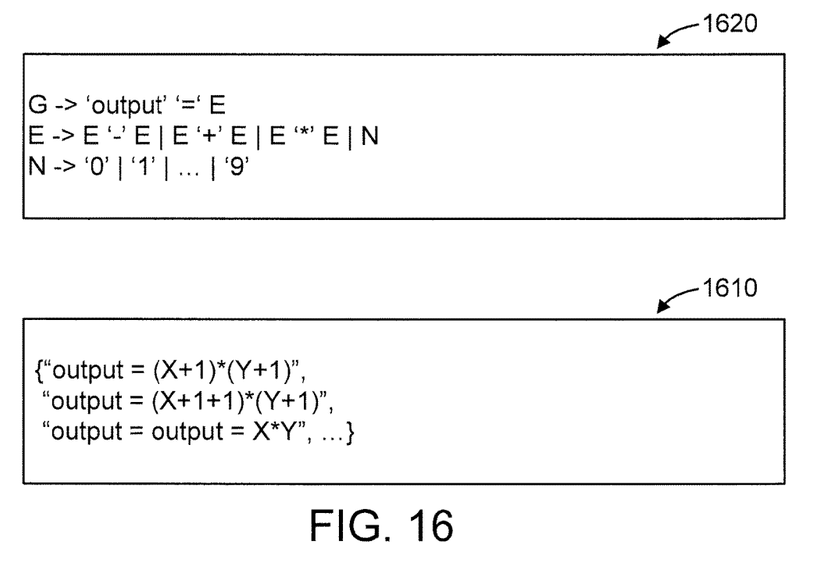
FIG. 16 shows exemplary prospective specifications constructed from the production rules of FIG. 15 and a syntax G of the formal specification, in accordance with an embodiment of the present invention.

Referring again to FIG. 12, at step 1240, construct multiple prospective specifications from the set of production rules taking into account a syntax of the formal specification. FIG. 16 shows exemplary prospective specifications 1610 constructed from the production rules 1510 of FIG. 15 and a syntax G 1620 of the formal specification, in accordance with an embodiment of the present invention.

At step 1250, perform a validation process on each of the multiple prospective specifications, using input-output examples. The validation process determines whether or not each of the multiple prospective specifications satisfy the formal specification, using input-output examples. The prospective specifications that satisfy the formal specification are considered validated.

At step 1260, generate the formal specification of the function from validated ones of the multiple prospective specifications. For example, step 1260 can generate the formal description 1010 shown in FIG. 10 regarding method 300. Thus, method 300 and method 1200 can output the same formal specification shown in FIG. 10. However, as noted above, method 1200 is a simplified version of method 300, lacking the annotations used in method 300.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for generating a formal specification of a function, the method comprising:
   extracting a set of words from requirements of the function;
   translating the set of words to a set of specification fragments;
   converting the set of the specification fragments to a set of production rules;
   constructing multiple prospective specifications from the set of production rules taking into account a syntax of the formal specification;
   validating each of the multiple prospective specifications using input-output examples; and
   generating the formal specification of the function from validated ones of the multiple prospective specifications.

2. The computer-implemented method of claim 1, wherein the requirements of the function, from which the set of words are extracted, are written in natural language.

3. The computer-implemented method of claim 2, wherein the set of words is translated into the set of specification fragments using only a local context of the words without consideration of syntax and semantics of the natural language.

4. The computer-implemented method of claim 1, wherein the set of words is translated into the set of specification fragments based on only word patterns and idiomatic patterns associated with one or more mathematical concepts.

5. The computer-implemented method of claim 1, wherein the set of words is translated into the set of specification fragments using semantic mapping.

6. The computer-implemented method of claim 1, wherein said converting step takes a context-free grammar of the formal specification and a set of production rules of the context-free grammar of the formal specification as inputs, and outputs a subset of the context-free grammar of the formal specification.

7. The computer-implemented method of claim 1, wherein said converting step uses a finite-state automaton and a finite-state transducer to convert the set of specification fragments to the set of production rules.

8. The computer-implemented method of claim 1, wherein said converting step comprises:
   computing a finite-state automaton by computing an approximation of the set of product rules of the context-free grammar of the formal specification;
   creating a finite-state transducer based on the finite-state automaton by introducing output symbols; and
   transforming the context-free grammar of the formal specification using the finite-state transducer.

9. The computer-implemented method of claim 1, wherein said translating step comprises creating possible combinations of specification fragments taking into account constraints on the possible combinations, the constraints being derived from a syntax of a language of the formal specification.

10. The computer-implemented method of claim 1, further comprising adding annotations to the set of words, in preparation for said translating step, and wherein said translating step translates the set of words into the set of specification fragments using the annotations.

11. The computer-implemented method of claim 1, further comprising adding annotations to the set of specification fragments, in preparation for said converting step, and wherein said converting step converts the set of specification fragments to the set of production rules using the annotations.

12. A computer program product for generating a formal specification of a function, the computer program product comprising a non-transitory computer readable storage medium having program instructions embodied therewith, the program instructions executable by a computer to cause the computer to perform a method comprising:
   extracting a set of words from requirements of the function;
   translating the set of words to a set of specification fragments;
   converting the set of the specification fragments to a set of production rules;
   constructing multiple prospective specifications from the set of production rules taking into account a syntax of the formal specification;
   validating each of the multiple prospective specifications using input-output examples; and
   generating the formal specification of the function from validated ones of the multiple prospective specifications.

13. The computer program product of claim 12, wherein the requirements of the function, from which the set of words are extracted, are written in natural language, and wherein the set of words is translated into the set of specification fragments using only a local context of the words without consideration of syntax and semantics of the natural language.

14. The computer program product of claim 12, wherein the set of words is translated into the set of specification fragments based on only word patterns and idiomatic patterns associated with one or more mathematical concepts.

15. The computer program product of claim 12, wherein said converting step takes a context-free grammar of the formal specification and a set of production rules of the context-free grammar of the formal specification as inputs, and outputs a subset of the context-free grammar of the formal specification.

16. The computer program product of claim 12, wherein said converting step uses a finite-state automaton and a finite-state transducer to convert the set of specification fragments to the set of production rules.

17. A computing device for generating a formal specification of a function, the computing device comprising:
   a processor and a memory operably coupled to the processor, configured to:
     extract a set of words from requirements of the function;
     translate the set of words to a set of specification fragments;
     convert the set of the specification fragments to a set of production rules;

construct multiple prospective specifications from the set of production rules taking into account a syntax of the formal specification;
validate each of the multiple prospective specifications using input-output examples; and
generate the formal specification of the function from validated ones of the multiple prospective specifications.

18. The computing device of claim 17, wherein the requirements of the function, from which the set of words are extracted, are written in natural language, and wherein the set of words is translated into the set of specification fragments using only a local context of the words without consideration of syntax and semantics of the natural language.

19. The computing device of claim 17, wherein the set of words is translated into the set of specification fragments based on only word patterns and idiomatic patterns associated with one or more mathematical concepts.

20. The computing device of claim 17, wherein said converting step uses a finite-state automaton and a finite-state transducer to convert the set of specification fragments to the set of production rules.

* * * * *